(12) United States Patent
Lyle

(10) Patent No.: US 6,607,302 B2
(45) Date of Patent: Aug. 19, 2003

(54) TEMPERATURE SENSOR HOUSING DESIGN

(75) Inventor: William Richard Lyle, Doyle Town, PA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/961,675

(22) Filed: Sep. 24, 2001

(65) Prior Publication Data

US 2003/0058920 A1 Mar. 27, 2003

(51) Int. Cl.[7] .......................... G01K 1/14; G01K 13/00; G01K 7/22
(52) U.S. Cl. ........................................ 374/185; 374/144
(58) Field of Search ................................ 374/185, 144, 374/208; 73/866.5

(56) References Cited

U.S. PATENT DOCUMENTS

| | | | | |
|---|---|---|---|---|
| 2,379,530 A | * | 7/1945 | Lederer ........................ | 374/185 |
| 3,890,588 A | * | 6/1975 | Kanaya et al. .................. | 374/185 |
| 3,919,680 A | * | 11/1975 | Ueno et al. .................... | 374/144 |
| 4,492,948 A | * | 1/1985 | Clayton et al. ................. | 374/185 |
| 5,024,534 A | * | 6/1991 | Matsubara et al. .......... | 374/144 |
| 5,046,857 A | * | 9/1991 | Metzger et al. ............. | 374/208 |
| 5,642,717 A | | 7/1997 | Gilman et al. | |
| 5,743,646 A | * | 4/1998 | O'Connell et al. ......... | 374/148 |
| 5,749,656 A | * | 5/1998 | Boehm et al. ............... | 374/185 |
| 5,753,835 A | * | 5/1998 | Gustin ........................ | 374/208 |
| 6,151,974 A | * | 11/2000 | Acht et al. ............... | 733/866.5 |
| 6,220,749 B1 | * | 4/2001 | Wyker ........................ | 374/141 |
| 6,457,373 B1 | * | 10/2002 | Lysen et al. ............... | 73/866.5 |
| 2003/0002561 A1 | * | 1/2003 | Yu ............................. | 374/208 |

\* cited by examiner

*Primary Examiner*—Diego Gutierrez
*Assistant Examiner*—Mirellys Jagan
(74) *Attorney, Agent, or Firm*—Brinks Hofer Gilson & Lione

(57) ABSTRACT

The present invention is generally directed towards a temperature sensing device installed in a cylinder head of an internal combustion engine. The temperature sensing device comprises an housing made of a thermally conductive material. The housing has a closed portion and an extended portion. When the housing is installed in the cylinder head, the extended portion undergoes an axial deformation and establishes a thermal contact between the housing and the cylinder head. The closed portion has a cavity where an insert formed of a resin is inserted inside the cavity. A sensing element disposed inside the insert is forced into contact with the housing. Therefore, the sensing element is in contact with the housing. The housing is further in contact with the cylinder head to accurately measure the temperature of the cylinder head.

18 Claims, 4 Drawing Sheets

TEMPERATURE SENSOR HOUSING DESIGN

TECHNICAL FIELD OF THE INVENTION

This invention generally relates to a temperature sensing system in the engine of a motor vehicle. More specifically, this invention relates to a temperature sensing device installed in the cylinder head of an engine of a motor vehicle.

BACKGROUND ART

Modern automotive engines typically rely on numerous engine parameters for correct engine operation. Optimum engine parameters are generally stored in the memory of an engine controller. Sensors on the engine are used to sense actual engine parameters while the controller compares these sensed values to the stored optimum valves. As a result, it is important that a reliable, repeatable sensor be installed in the engine having little engine-to-engine variation, such that a correct engine operating parameter is sensed.

Various sensors for sensing the temperature of a rigid body, such as a cylinder head of an internal combustion engine, have been developed. The sensor must be in intimate thermal contact with the rigid body to sense the proper temperature. To provide good thermal conductivity, some sensor designs utilize a spring such that, when installed, the spring provides a force to bias the sensor into contact with the rigid body to establish adequate thermal conductivity. Still other sensor designs rely on the mounting threads to provide the conductive path between the rigid body and the sensor. However, the previous temperature sensors have not provided an accurate reading of the temperature parameters in the cylinder head of an engine.

SUMMARY OF THE INVENTION

In accordance with one aspect of the invention a temperature sensing device and method of forming the same that improves the temperature reading capabilities in a cylinder head of the engine in an automobile is provided.

Yet another aspect of the invention is to have a temperature sensing device installed in the cylinder head having a closed portion and an extended portion. Preferably, the closed portion defines a cavity. An insert formed of a resin is inserted into the cavity. The insert preferably has a temperature sensing portion and a connector portion. The temperature sensing portion has a sensing element disposed in the insert. The insert ensures that the sensing element is in contact with the housing.

In accordance with another aspect of the invention when the housing having the insert and the sensing element is inserted into the cylinder head the extended portion of the housing is axially deformed such that the housing is in thermal contact with the cylinder head.

BRIEF DESCRIPTION OF THE DRAWINGS

Further features and advantages of the invention will become apparent from the following discussion and the accompanying drawings in which.

DETAILED DESCRIPTION OF THE PREFERRED EMBODIMENT

Figure 1:
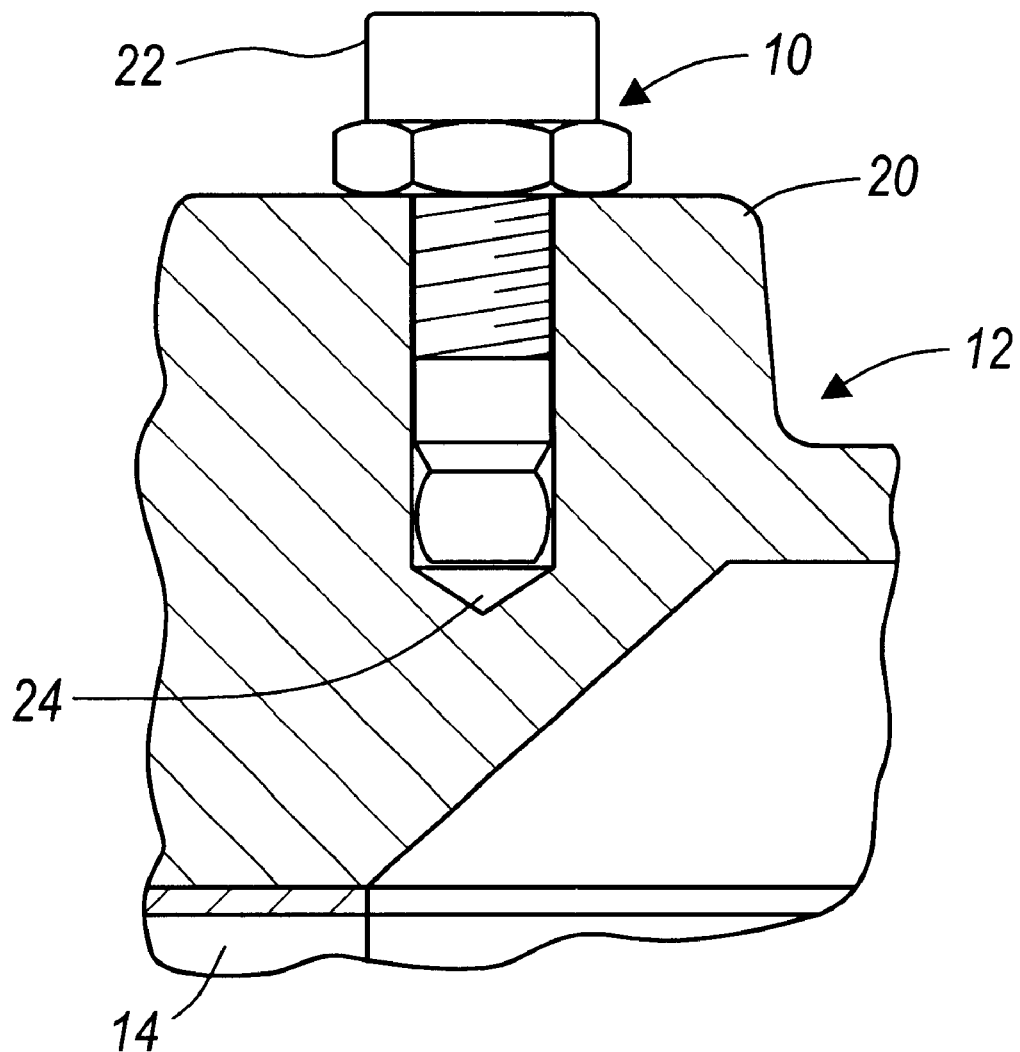
FIG. 1 is a perspective view of the internal combustion engine incorporating the temperature sensing device in accordance with the teachings of the present invention.

The following description of the preferred embodiment is merely exemplary in nature and is in no way intended to limit the invention or its application or uses.

Referring in particular to the drawings, a temperature-sensing device in accordance with the teachings of the present invention is illustrated and generally designated by reference numeral 10. The temperature sensing device 10 detects the temperature in an internal combustion engine 12. The engine 12 includes cylinder block 14 having a plurality cylinder (not shown). The engine 12 is well known in the art and includes other parts such as a fire deck, a piston and a spark plug. Engine 12 further includes a cylinder head 20 mounted to the cylinder block 14.

Figure 2:
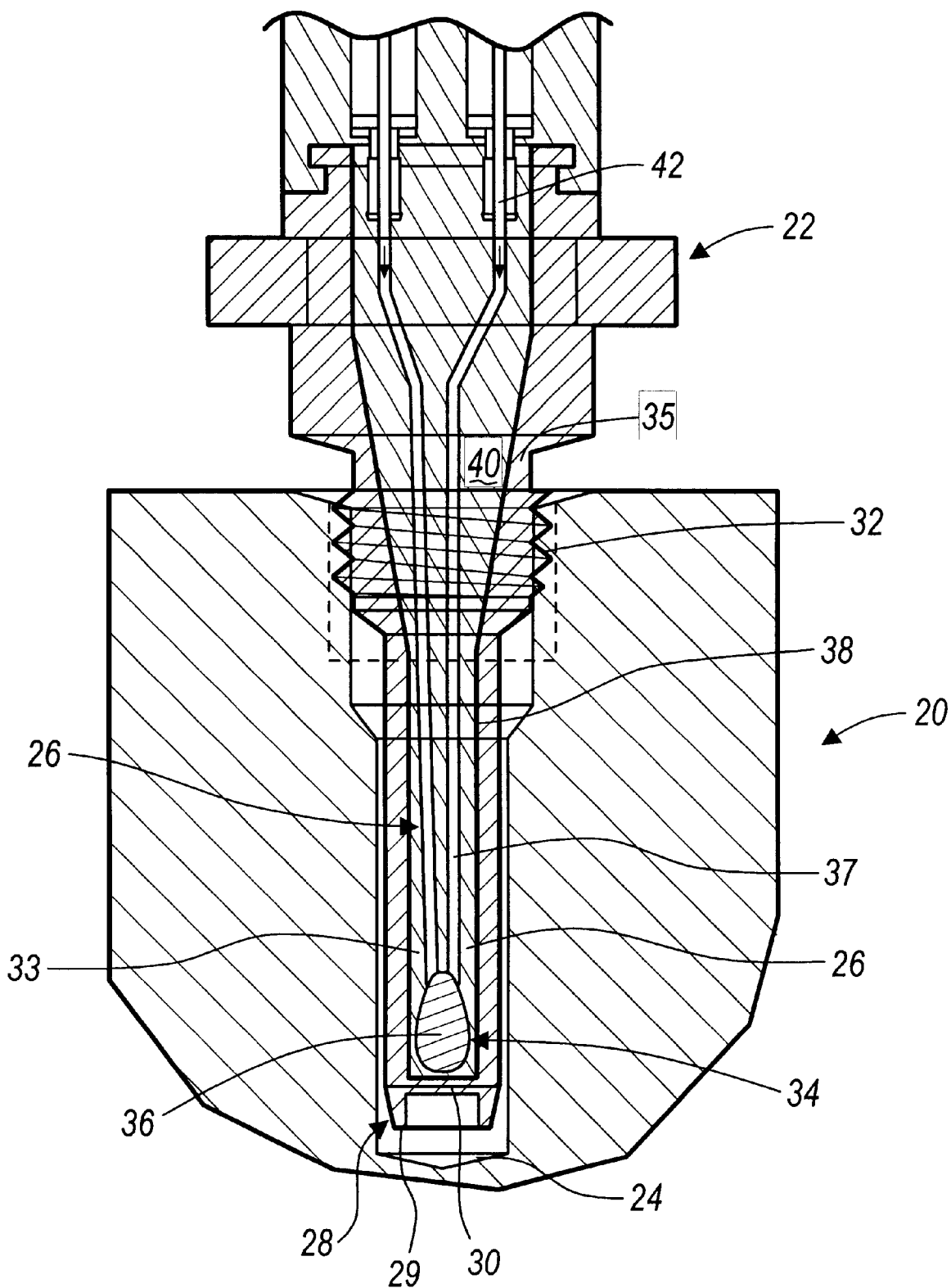
FIG. 2 is a cross-sectional view of a cylinder head having the temperature sensing device before installation in accordance with the teachings of the present invention.

As shown in FIG. 2, the temperature sensing device 10 preferably communicates with cylinder head 20 and measures the temperature of cylinder head 20. The temperature measured by the temperature sensing device 10 is relayed to a controller (not shown). The controller is typically well known to those in the art may include a plurality of microprocessors to determine the temperature of the cylinder head.

Figure 4:
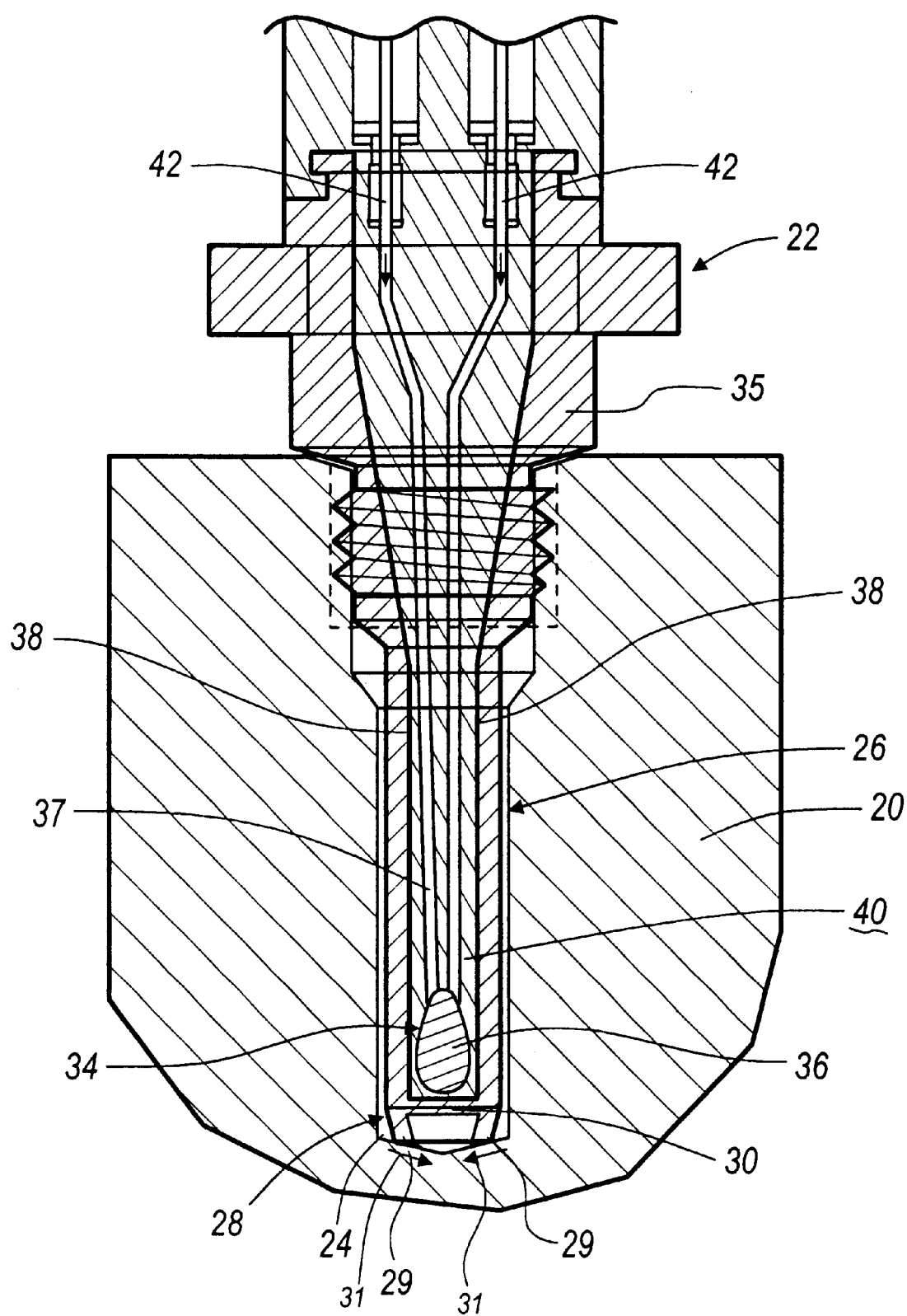
FIG. 4 is a cross-sectional view of a cylinder head having the temperature sensing device after installation in accordance with the teachings of the present invention.

As shown in FIGS. 2 and 4, the temperature sensing device 10 preferably includes a housing 22 that extends into a bore 24 in the cylinder head 20. Housing 22 has a closed portion 26 an extended portion 28 extending axially from the closed portion 26. Housing 22 at the extended portion 28 is capable of being deformed such that housing 22 is in thermal contact with cylinder head 20.

Figure 3:
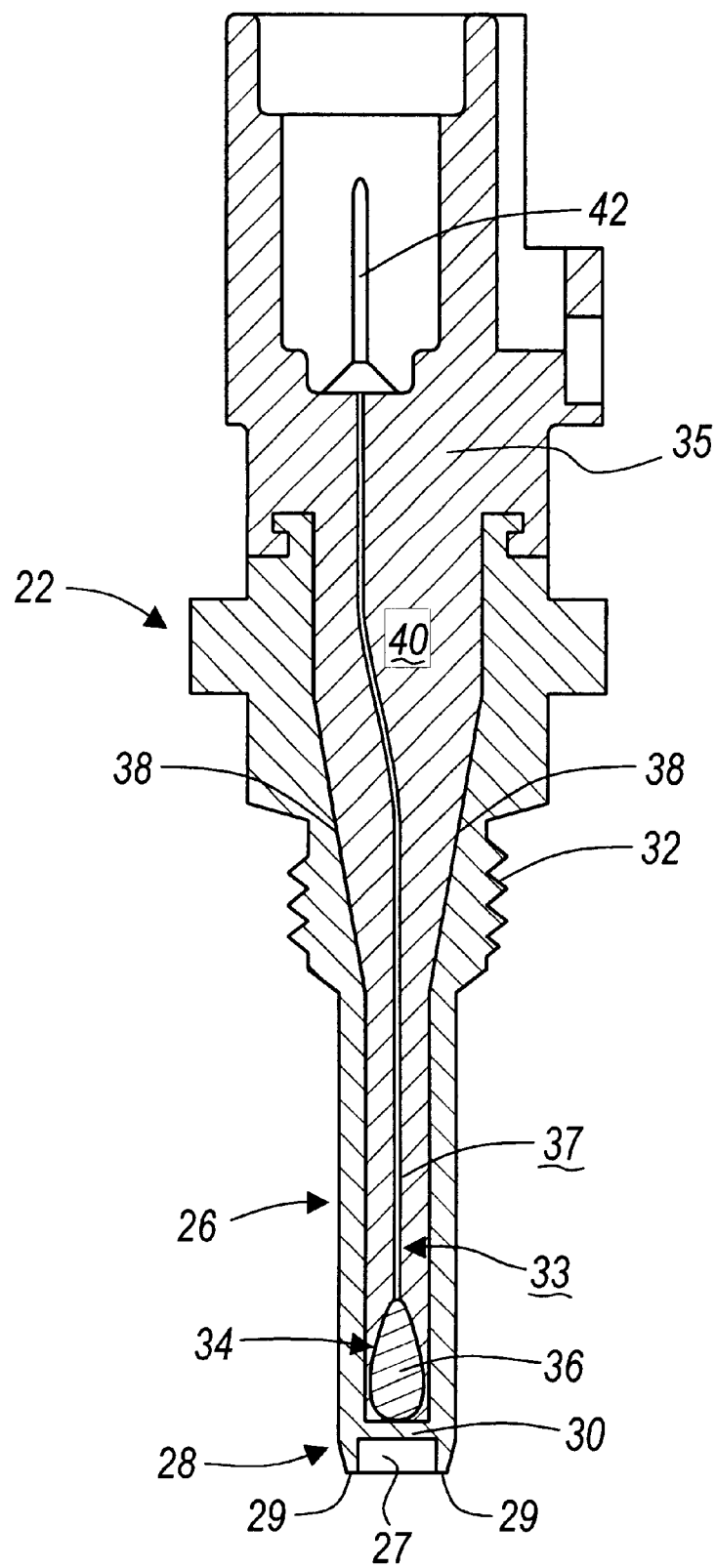
FIG. 3 is the view along lines A—A in FIG. 2 in accordance with the teachings of the present invention.

Referring in particular to FIGS. 2 and 3, the housing 22 of the temperature sensing device 10 in accordance with the teachings of the present invention comprises a closed portion 26, and an extended portion 28. The extended portion 28 is preferably located on housing 22 towards cylinder head 20. Closed portion 26 is preferably tubular in shape and has a closed end 30 and a threaded portion 32 at the other end of the closed end 30. Closed portion 26 defines a cavity 38. An insert 40 formed of a resin is inserted into cavity 38. As will be explained later, when housing 22 is threaded into the bore 24, the extended portion 28 undergoes an axial deformation such that housing 22 is in thermal contact with cylinder head 20. The closed portion 26 of housing 22 is preferably formed of a highly conductive material such as brass. Alternatively, other materials that are good conductor of heat such as aluminum or zinc may be used.

The extended portion 28, as explained above, is preferably axially displaced from the closed end 30 of the closed portion 26 and extends beyond the closed portion 26. It is preferred that the extended portion 28 is of shorter length as compared to closed portion 26. As shown in FIG. 3, extended portion 28 has tapered end 29 such that cross-section of housing 22 decreases from closed portion 26 to extended portion 28. Preferably, closed portion 26 and extended portion 28 are formed as an integral piece. Preferably, extended portion 28 is also formed of a thermally conductive metallic material such as brass. Alternatively, just like closed portion 26, extended portion 28 is adaptable to be formed of any material such as aluminum or zinc that is a good conductor of heat.

Housing 22 further defines an open area 27, in an area between the tapered ends 29 of extended portion 28. As will be explained later, open area 27 allows for deformation of extended portion 28.

Referring in particular to FIGS. 2, 3 and 4, the closed portion 26 of housing 22 defines a cavity 38. An insert 40 formed of a resin is capable of being inserted inside cavity 38. As shown in the FIGURES, the insert 40 has a temperature sensing portion 33 and a connector portion 35. The temperature sensing portion 33 includes a sensing element 34. Preferably the sensing element 34 is a thermistor assembly. Preferably, the sensing element 34 is disposed inside the insert 40. The connector portion 35 includes a terminal 42. The sensing element 34 is well known in the art and comprises a temperature measuring device 36 such as a thermometer, that is connected to terminal 42 through a plurality of leads 37. Although in this invention a thermometer is used, it must be understood that any other temperature measuring device may be used.

Since the sensing element 34 is the actual temperature measuring device of the temperature measuring device 10, in order to achieve accurate reading of cylinder head 20 every single time, it is important to have a thermal contact between the thermistor assembly 34 and the housing 22.

The insert 40 is formed of a resin selected from a group consisting of nylon 6-6, nylon 6-12, Polybutylene Terephthalate (PBT), Polyethylene Terephthalete (PET), or polyphenylene sulfide (PPS). Preferably, insert 40 fills cavity 38 and positively locates sensing element 34 inside the housing 22 such that a surface of the sensing element 34 is in contact with housing 22. Preferably, as shown in FIG. 4, temperature measuring device 36 is in thermal contact with end 30 of closed portion 26. Alternatively, any surface of the temperature measuring device 36 may contact housing 22 at any other point in housing 22.

Referring in particular to FIG. 4, when housing 22 is completely threaded into bore 24, extended portion 28 of housing 22 is axially deformed such that housing 22 is in thermal conductive contact with bore 24. Tapered end 29 of the extended portion 28 deforms in the direction as shown by arrows 31. Preferably, heat is conducted from bore 24 to housing 22 via deformed end 29 of extended portion 28. Housing 22, therefore undergoes substantially all the deformation in extended portion 28. Insert 40 inside the cavity 38 of the closed portion 26 of housing 22 positively locates the sensing element 34 to have contact with housing 22 and in turn thermal contact with cylinder head 20.

The present invention also provides for an easy assembly of the temperature sensing system 10 in the bore 24 of the cylinder head 20. In this process, the housing 22 and the thermistor assembly 34 is placed inside a molding machine. The next step includes injection of the molten resin into the molding machine such that molten resin substantially fills cavity 38 of closed portion 26. The resin will force the thermistor assembly 34 to be in contact with housing 22. Preferably, the molten resin is cured by additional techniques. After the resin is cured, the temperature sensing device 10 is removed from the mold and inserted into bore 24 of cylinder head 20. As the temperature sensing device 10 is inserted into bore 24 extended portion 28 undergoes axial deformation such that housing 22 is in thermal contact with cylinder head 20. In this arrangement, the insert 40 formed of the resin positively locates the sensing element 34 to be in contact with the housing 22. The axial deformation of the housing 22 ensures a thermal contact with the cylinder head 20. Therefore, this arrangement will ensure accurate temperature reading of cylinder head 20.

As any person skilled in the art will recognize from the previous description and from the figures and claims, modifications and changes can be made to the preferred embodiment of the invention without departing from the scope of the invention as defined in the following claims.

What is claimed is:

1. A housing for a temperature sensor in communication with a cylinder head of an internal combustion engine of an automobile, the housing comprising:

a closed portion having a closed end and a threaded end opposite the closed end, wherein the closed portion defines a cavity;

an extended portion axially extending from the closed portion such that the extended portion is adaptable to be deformed when the housing is installed in the cylinder head; and an insert formed of a resin having a temperature sensing portion and a connector portion disposed inside the cavity wherein the temperature sensing portion includes a sensing element such that a surface of the sensing element in contact with the closed end of the housing.

2. The sensor of claim 1, wherein the sensing element disposed within the temperature sensing portion further comprises a temperature measuring device and at least one connector wire connecting the temperature measuring device to the connector portion.

3. The sensor of claim 1, wherein the connector portion further comprises a terminal.

4. The housing of claim 1, wherein the extended portion is axially deformed when the housing is installed in the cylinder head such that the housing is in thermal contact with the cylinder head.

5. The housing of claim 1, wherein the resin is selected from a group consisting of nylon 6-6, nylon 6-12, polybutylene, terephthatate, polyethylene terephthatate or polyphenylene sulphide.

6. The housing of claim 1, wherein the housing further defines an open portion such that the axial deformation of the extended portion occurs in the open portion.

7. The housing of claim 1, wherein the extended portion and the closed portion are made of a thermally conductive material.

8. The housing of claim 7, wherein the thermally conductive material is brass.

9. A temperature sensor communicating with a cylinder head of an internal combustion engine for measuring the temperature of the cylinder head, the sensor comprising:

a housing having a closed portion and an extended portion extending from the closed portion, wherein the closed portion and the extended portion of the housing are formed of a thermally conductive material wherein the closed portion defines a cavity; and an insert formed of a resin having a connector portion and a temperature sensing portion disposed inside the cavity, wherein the temperature sensing portion includes a sensing element such that a surface of the sensing element is in contact with the housing, and wherein the extended portion is axially deformed when the housing is positioned inside the cylinder head such that the housing and the cylinder head are in thermal contact with each other.

10. The sensor of claim 9, wherein the thermally conductive material is selected from a group consisting of brass, aluminum or zinc.

11. A temperature sensor communicating with a cylinder head of an internal combustion engine for measuring the temperature of the cylinder head, the sensor comprising:

a housing having a closed portion and an extended portion extending from the closed portion, wherein the closed portion defines a cavity; and an insert formed of a resin having a connector portion and a temperature sensing portion disposed inside the cavity, wherein the temperature sensing portion includes a sensing element wherein the sensing element further comprises a temperature measuring device and at least one connector wire connecting the sensing element to the connector portion, such that a surface of the temperature measuring device is in contact with the closed portion, and wherein the extended portion is axially deformed when the housing is positioned inside the cylinder head such that the housing and the cylinder head are in thermal contact with each other.

12. The sensor of claim 11, wherein the connector portion further comprises a terminal.

13. The sensor of claim 11, wherein the resin is selected from a group consisting of nylon 6-6, nylon 6-12, polybutylene, terephthatate, polyethylene terephthatate or polyphenylene sulphide.

14. The sensor of claim 11, wherein the housing further defines an open area such that the axial deformation of the extended portion occurs in the open area.

15. The sensor of claim 11, wherein the closed portion is tubular in shape and has a closed end and a threaded end opposite the closed end, such that when the threaded end is installed in the cylinder head the extended portion is axially deformed to establish thermal contact between the housing and the cylinder head.

16. The sensor of claim 15, wherein the surface of the sensing element is in thermal contact with the closed end of the closed portion of the housing.

17. The sensor of claim 11, wherein the closed portion and the extended portion of the housing are formed of a thermally conductive material.

18. The sensor of claim 17, wherein the thermally conductive material is selected from a group consisting of brass, aluminum or zinc.

* * * * *

UNITED STATES PATENT AND TRADEMARK OFFICE
CERTIFICATE OF CORRECTION

PATENT NO. : 6,607,302 B2                                                                                                Page 1 of 1
DATED : August 19, 2003
INVENTOR(S) : William Richard Lyle It is certified that error appears in the above-identified patent and that said Letters Patent is hereby corrected as shown below:

<u>Title page,</u>
Item [75], Inventor, delete "Doyle" and substitute -- Doyles -- in its place.

Signed and Sealed this

Twentieth Day of January, 2004

JON W. DUDAS
*Acting Director of the United States Patent and Trademark Office*